United States Patent
Eggleton et al.

[11] 3,817,089
[45] June 18, 1974

[54] ROTATING PROBE HIGH DATA ACQUISTION RATE APPARATUS

[75] Inventors: Reginald C. Eggleton; Albert W. Weidner, both of Champaign, Ill.

[73] Assignee: Interscience Research Institute, Champaign, Ill.

[22] Filed: Oct. 19, 1972

[21] Appl. No.: 299,042

Related U.S. Application Data

[62] Division of Ser. No. 158,154, June 30, 1971.

[52] U.S. Cl............................... 73/67.8 S, 335/206
[51] Int. Cl............................................ A61b 5/04
[58] Field of Search .................... 73/67.8 S; 335/206

[56] References Cited
UNITED STATES PATENTS

| | | |
|---|---|---|
| 3,159,023 | 12/1964 | Steinbrecher..................... 73/67.8 S |
| 3,250,866 | 5/1966 | Ryno................................. 335/206 |
| 3,308,652 | 3/1967 | Appel et al. ...................... 73/67.8 S |
| 3,382,707 | 5/1968 | Heselwood ....................... 73/67.8 S |
| 3,431,774 | 3/1969 | Dory................................. 73/67.8 S |

*Primary Examiner*—William E. Kamm
*Attorney, Agent, or Firm*—Hill, Gross, Simpson, Van Santen, Steadman, Chiarra & Simpson

[57] ABSTRACT

An instrument and method which allows real time examination of internal organs of the body such as the heart comprising a catheter which has a rotating tip in which a number of ultrasonic transducers are mounted and which can be selectively connected to a pulser to transmit a ultrasonic pulse into the body and receive an echo from such pulse and including commutating, indexing and presentation means such that display of the conditions within the body may be obtained.

2 Claims, 6 Drawing Figures

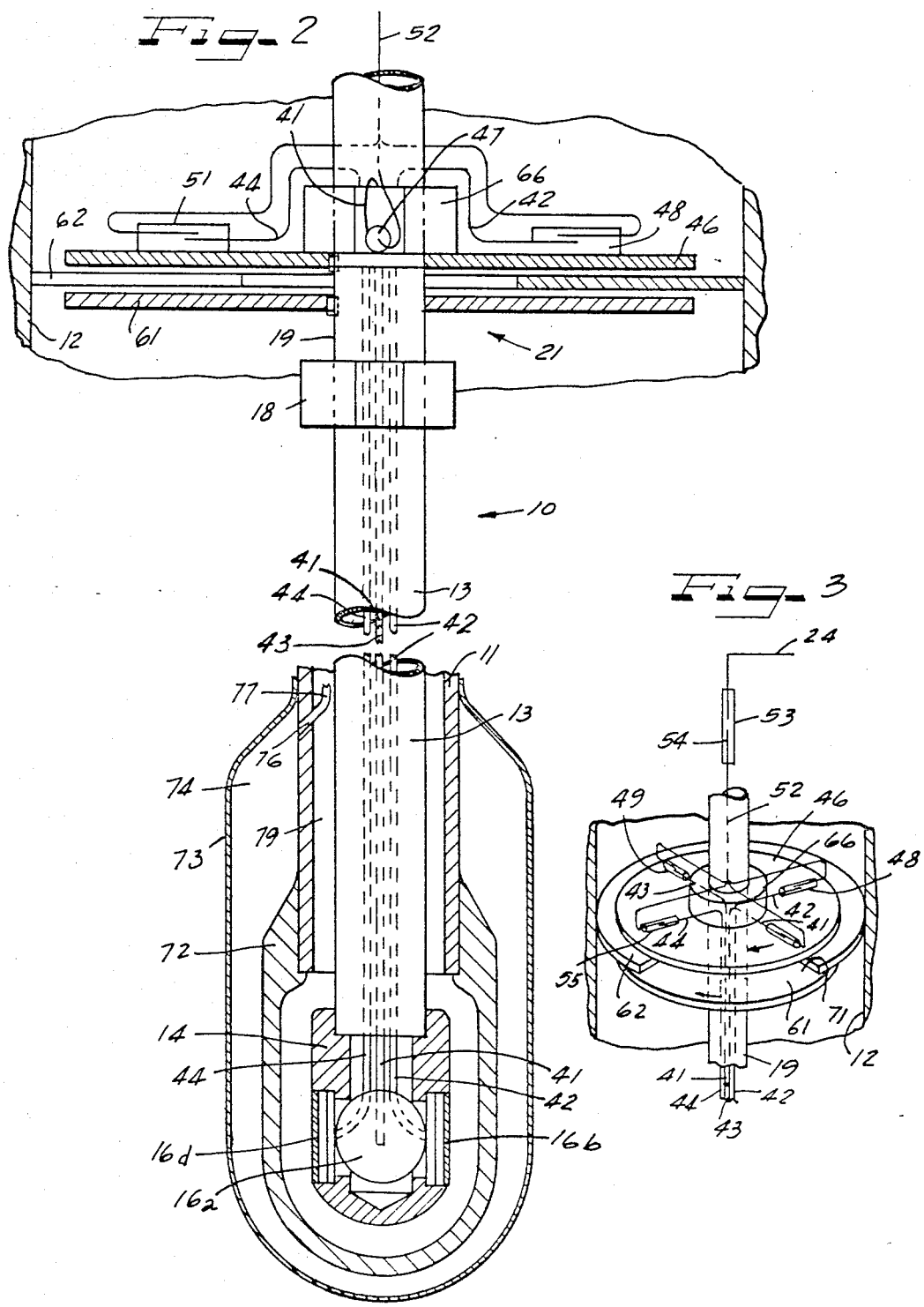

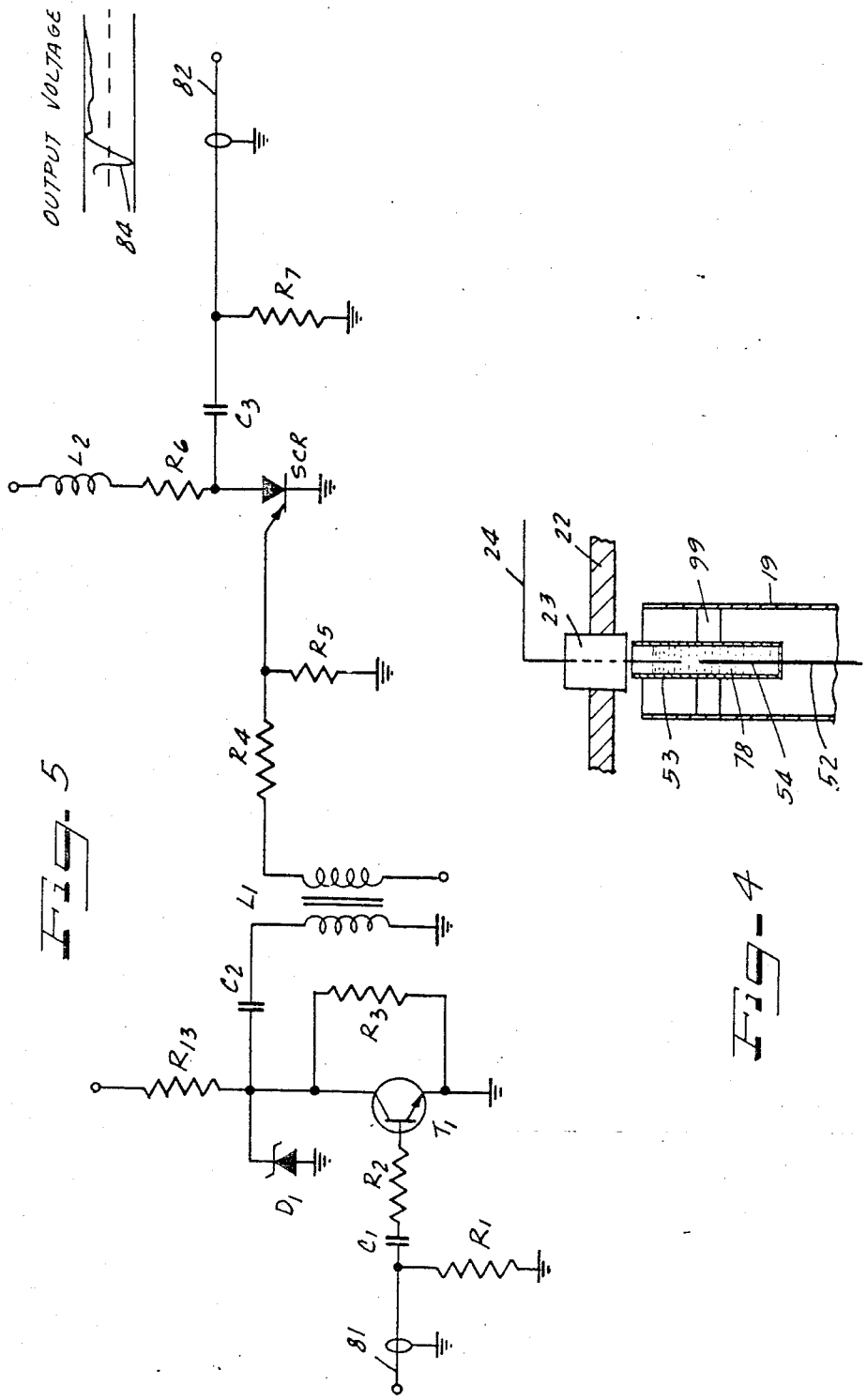

ROTATING PROBE HIGH DATA ACQUISTION RATE APPARATUS

This is a division, of application Ser. No. 158,154, filed June 30, 1971.

BACKGROUND OF THE INVENTION

1. Field of the Invention

This invention relates in general to medical instruments for observing organs of the body and in particular to those which may be inserted into the body for detailed observations.

2. Description of the Prior Art

The study of internal organs of the body has proved to be very difficult, however, it has been known that the dynamics of organs such as the heart are very important in studying and treating heart abnormalities. Attempts have been made to measure internal and external dimensions of the heart during the course of the cardiac cycle and certain investigators have used mercury filled rubber tubing to measure changes in the circumference of the heart for the study of geometric changes in the left ventricle, particularly its shape during the cardiac cycle as the altered relation from moment to moment between the internal volume and the surface area. Changes in the wall thickness alter and also modify the stress distribution across the ventricular wall during the cardiac cycle. Other investigators have utilized biplane cinefluoroscopy to measure cardiac dimensions in which the geometry of the left ventricle was studied by visualization of six lead beads placed near the endocardium of this chamber. Studies of the shape of the left ventricle have also been obtained through cinefluoroscopy using radiopaque medium injected into the ventricle with a cardiac catheter. Unfortunately, this view of the heart is limited to two planes and the third plane normal to the axial coordinates of the subject cannot be visualized.

BRIEF SUMMARY OF THE INVENTION

The present invention comprises a rotating catheter which may be placed into the esophagus and coupled to the surrounding tissue for maximum efficiency in coupling ultrasonic energy to and from the transducer. A plurality of ultrasonic transducers are mounted in the rotating catheter and the tip of the rotating catheter containing the transducers is placed such that the heart may be observed by transmission and reception of ultrasonic energy. The heart is particularly difficult to visualize because of its motion and its location. It is surrounded by acoustically opaque lung and bone and there are only a few windows through which the heart may be observed. The present invention utilizes these windows to ultrasonic energy which exists between the esophagus and the heart as well as the intercostal spaces along the sternum and the catheter may be placed into the esophagus of the cardiac patient without the undue risk inherent in placing a catheter directly into the heart, particularly where the heart may be irritable and subject to fibrillation due to disease and infirmity. As the catheter is rotated the various transducers are commutated so that the sector directed toward the heart may be observed by detecting and presenting the ultrasonic echoes received. Means are provided for commutating the pulses and echoes to the rotating transducers and for presenting the information on a suitable display and recording apparatus. The maximum data acquisition rate is used limited only by the speed of sound in tissue.

Other objects, features and advantages of the invention will be readily apparent from the following description of certain preferred embodiments thereof taken in conjunction with the accompanying drawings, although variations and modifications may be effected without departing from the spirit and scope of the novel concepts of this disclosure and in which:

BRIEF DESCRIPTION OF THE DRAWINGS

FIG. 2 is a partially cut-away view of the probe and commutator of this invention;

FIG. 3 is the cut-away perspective view of the commutator of this invention;

FIG. 4 illustrates the means for removing the electrical output from the rotating catheter assembly of this invention;

FIG. 5 is a detailed view of the pulser of this invention; and

DESCRIPTION OF THE PREFERRED EMBODIMENTS

The present invention comprises an instrument which will allow real time examination of the heart dynamics using a noninvasive ultrasonic technique. The system allows the structure of the heart to be observed during its contractile cycle at rates of 24 frames per second. The heart may be observed on a monitor in a two-dimensional cross section either continuously or observed on a single frame by frame basis.

The invention includes a catheter having an array of ultrasonic transducers at the tip with four ultrasonic transducers which is inserted into the esophagus through a protective sheath. The catheter may be rotated at a speed of 360 rpm for example and each of the four transducers is utilized sequentially during the same 90° segment of rotation which segment corresponds to the direction of the heart from the esophagus. Thus, four sequential frames of information are obtained for each revolution of the catheter.

The catheter may be inserted into the esophagus or on the chest wall of the patient rather than directly into the heart. This method is less traumatic to the patient and can be used under conditions where insertion of a catheter directly into an ailing heart would not be possible. The invention allows the performance of an ailing heart to be studied under conditions which are not available at present through any other means.

Figure 1:
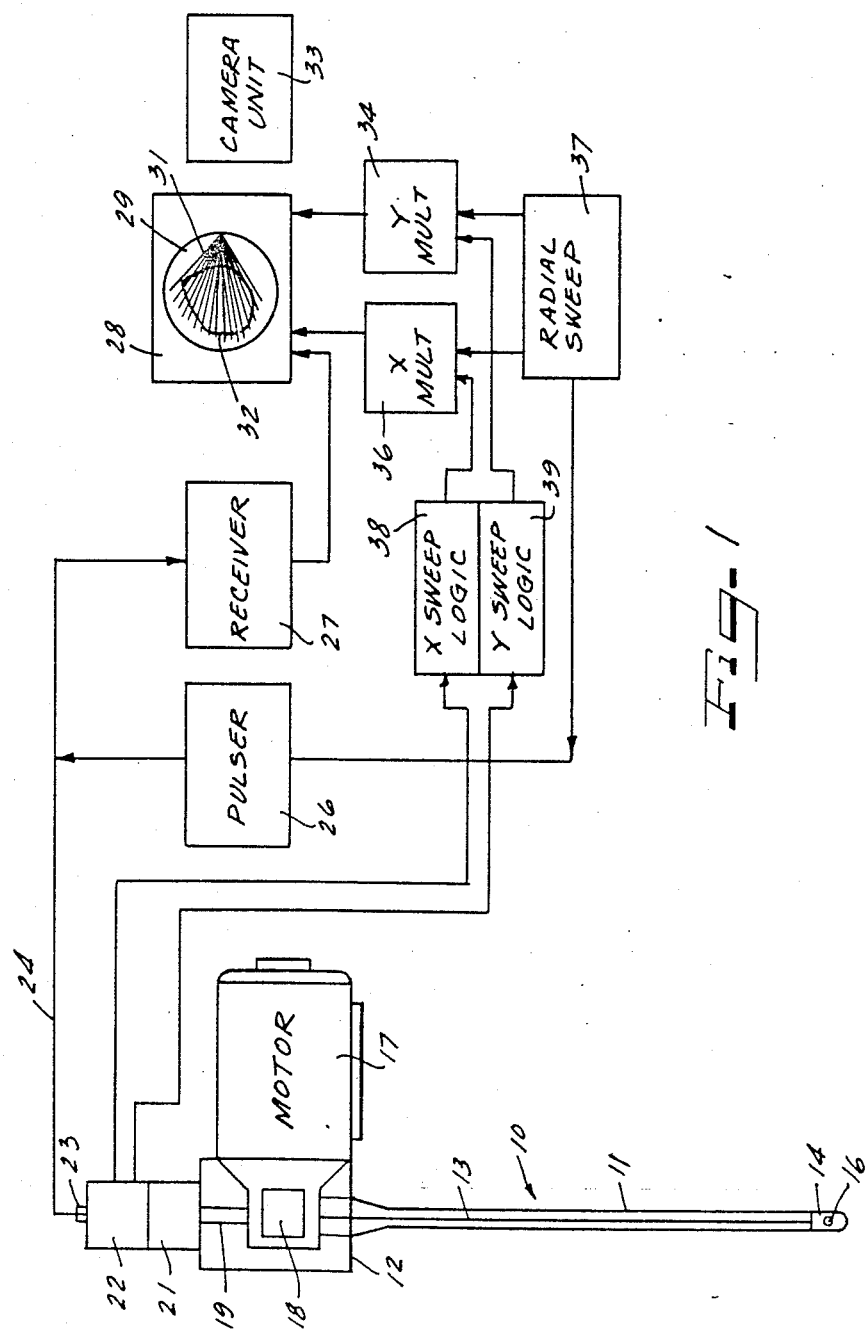
FIG. 1 is a block diagram of the noninvasive ultrasonic apparatus of this invention.

FIG. 1 illustrates an esophageal probe 10 which comprises an outside sheath 11 which is connected to a housing 12. A motor 17 is connected to the housing 12 and has a gear train 18 which is connected to a rotating catheter 13 which is mounted in the sheath 11. The rotating catheter 13 has a tip 14 which has a plurality of ultrasonic transducers 16a–16d mounted therein. The transducers 16a–16d may be selectively connected so as to transmit ultrasonic energy and receive ultrasonic pulses and supply them to the presentation means.

A shaft 19 extends upwardly from the gear train 18 and passes through a commutator 21 and a resolver 22.

An input-output lead 24 is coupled to the rotating catheter through a support 23 and the lead 24 is connected to a pulser 26 and receiver 27. The receiver 27 supplies an output to a display device 28 which might, for example, be a cathode ray tube which has a display portion 29 on which radial sweeps 31 are presented. Echoes are presented as a trace 32.

A camera unit 33 may make permanent record of the information obtained from the rotating catheter and may take movies of the output on the scope 29 or may alternatively take a plurality of still pictures, depending upon the type of camera utilized.

A radial sweep generator 37 supplies an output to the pulser 26 to control its output pulses and also supplies output to the X and Y multipliers 36 and 34, respectively, which control the X and Y traces of the oscilloscope 28. The sine-cosine potentiometer 22 supplies inputs to the X sweep logic 38 and the Y sweep logic 39. The X sweep logic 38 supplies an input to the X multiplier 36 and the Y sweep logic 39 supplies an input to the Y multiplier 34.

FIG. 2 is an enlarged exploded view of the rotating catheter and sheath of the invention. The rotating catheter 13 has a tip 14 which supports the four piezoelectric transducers 16a–16d which are mounted at 90° angles in the tip 14. Leads 41, 42, 43 and 44 are respectively connected to the transducers 16a–16d and pass up through the rotating catheter 13 which is hollow to the commutating means 21. The stationary shield 11 encases the rotating catheter 13 and has a tip portion 72 which surrounds the transducers 16a–16d and which efficiently couples the ultrasonic energy from the transducers. The tip cover 72 might be made of L100 DuPont urethane plastic, for example. An inflatable balloon 73 surrounds the lower end of the catheter and is attached to the metal sheath 11 and may be filled by fluid so as to inflate it such that the walls of the balloon 73 engage the walls of the esophagus so as to improve the coupling between the transducers 16a–16d and the tissue under observation. A supply tube 77 passes through an opening 76 in the stationary sheath 11 and at the upper end of the catheter fluid may be supplied to the balloon 73 so as to inflate it. A water-gelatin mixture may be used which has good acoustical characteristics.

Fluid 79 is mounted between the rotating catheter 13 and the inside wall of the stationary sheath 11. Such fluid provides lubricant for the flexible shaft 13 within the catheter and also serves as a transmission medium for the sound from the transducers to the tissue under observation. A silicon oil operates satisfactorily for this purpose.

It is to be realized that the catheter sheath 11 as well as the flexible shaft 13 may be flexible so as to follow the contours of the body for insertion into the esophagus of a patient. The inside of the flexible sheath 13 is filled with air and the electrical supply leads 41–44 for the transducers 16a–16d pass up through the flexible rotating housing 13. The housing 13 may be a flexible stainless steel shaft constructed of right and left helices to maximize the torsional stiffness of the rotating assembly within the stationary housing 11. The flexible shaft 13 might be type Q4697 manufactured by S. S. White and Company.

The leads 41–44 are coaxial cable and might be type UT8 which is a miniature coax cable manufactured by Uniform Tubes Company and provides an appropriate impedance match.

The transducers 16a–16d might comprise ferroelectric material which is lead metaniobate LM302 manufactured by the General Electric Company.

The commutator 21 allows electrical inputs and outputs to be supplied respectively to the transducers 16a–16d. The commutating is accomplished by reed switches and a magnetic switching arrangement.

The upper end 19 of rotating shaft 13 is connected to a pair of rotating discs 46 and 61. The disc 46 has mounted thereon four reed switches 47, 48, 49 and 51 mounted at 90° points on the surface of the disc and the coaxial leads 41–44 are respectively connected to the switches 47–51. An input lead 52 is connected to the other side of all of the reed switches 47–51 and the reed switches are of the type such that they are open when not subject to a magnetic field and closed when subjected to a magnetic field. The disc 61 comprises an annular permanent magnet. A shield 62 is mounted between the discs 46 and 61 and is formed with an opening 71 of 90° such that magnetic flux from the disc 61 may close one of the switches 47–51 when the switches are in the gap 71 of the shield 62. The shield 62 is supported from the housing 12 and thus as the shaft 19 rotates the switches 47–51 will be sequentially closed so that one of the transducers 16a–16d will be connected to the pulse and receiver as the shaft 13 rotates 90°. After rotating 90° the particular transducer will be disconnected from the pulser and receiver because its associated switch will open and the switch for the next adjacent transducer will be closed. Thus, means are provided for scanning a 90° sector from the tip of the catheter by the transducers 16a–16d.

As shown in FIG. 3 the common lead 52 from the switches 47–51 pass up to a mercury contact 53. The upper end 54 of lead 52 extends into the mercury contact 53 and the input-output lead 24 extends into the mercury contact 53 so as to supply electrical energy to and from the catheter.

FIG. 4 is a detailed view of the upper end of rotating shaft 19 and the mercury contact 53 which is supported from the walls of the shaft 19 by supporting means 99 and contains mercury 78. The lead 24 passes through the coupling 23 supported by the housing of the potentiometer 22 and thus the mercury 78 continuously makes electrical contact between the upper end 54 of lead 52 and lead 24.

FIG. 5 is an electrical schematic view of the pulser of this invention and has an input contact 81 which receives the output of the radial sweep generator 37 which is applied through a condenser C1 and a resistor R2 to the base of a transistor T1. A resistor R1 is connected to ground and the input terminal 81. The emitter of transistor T1 is connected to ground and a resistor R3 is connected between the emitter and collector. A resistor R13 is connected between the collector of transistor T1 and a suitable biasing source. A Zener diode D1 is connected between the collector of transistor T1 and ground. A capacitor C2 and the primary of a transformer L1 are connected from the collector of the transistor T1 to ground.

One end of the secondary of transformer L1 is connected to the gate of an SCR through a resistor R4. Resistor R5 is connected from the gate to ground. The cathode of the SCR is connected to ground and the anode is connected to a suitable biasing source through a resistor R6 and an inductor L2. The anode is also coupled through a capacitor C3 to an output terminal 82 which is connected to lead 24 which is connected to the catheter and to the receiver 27. The output pulse 84 is illustrated above the output terminal 82.

Figure 6:
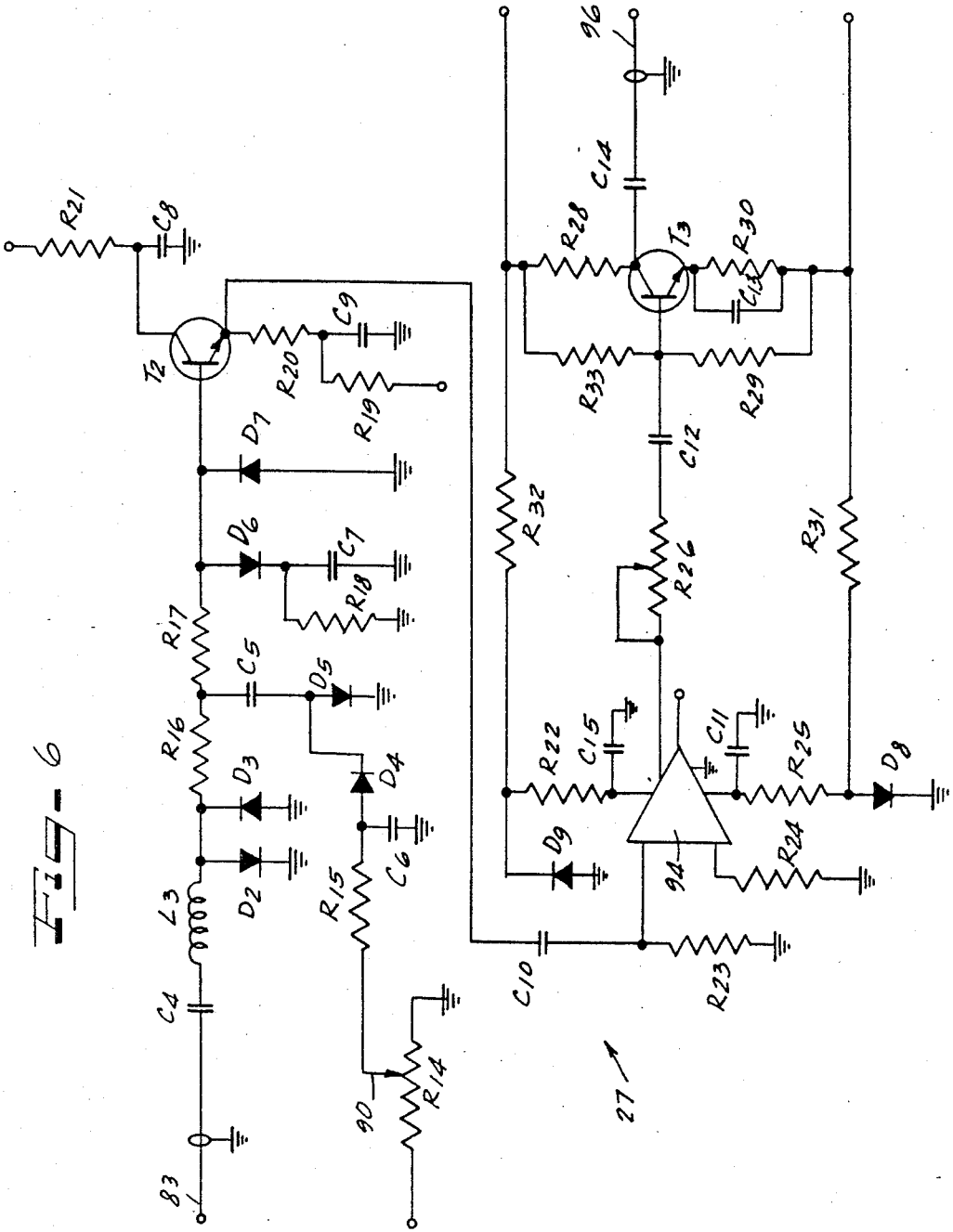
FIG. 6 is a schematic view of the clamp and video amplifier of this invention.

FIG. 6 illustrates the input of the portions of the receiver 27 which includes a clamper and video amplifier. The clamper circuit is desired so as to prevent the receiver from being saturated upon the output of the pulser 26 since the pulser output is at a much higher voltage level than that of the echoes received from the transducers 16a–16d. The input terminal 83 is connected to lead 24 from the catheter and is coupled through the capacitor C4 and inductor L3 to a pair of resistors R16 and R17 and to the base of a transistor T2. A pair of diodes D2 and D3 are connected between the junction point of the inductor L3 and resistor R16 and ground. The anode of diode D3 is connected to ground and the cathode of diode D2 is connected to ground. The emitter of transistor T2 is connected to the input of the video amplifier through capacitor C10. An operational amplifier 94 which might be for example a type MC1510G receives the output of the clamper circuit and applies output through resistor R26 and capacitor C12 to the base of transistor T3. The collector of transistor T3 is coupled to the output terminal 96 through a capacitor C14.

In the clamper circuit the collector of transistor T2 is connected to a suitable biasing source through a resistor R21. A capacitor C8 is connected between the collector of the transistor T2 and ground. A resistor R19 is connected between a suitable biasing source and the resistor R20 which is connected to the emitter of transistor T2. A capacitor C9 is connected from the resistor R20 to ground. Diode D7 has its cathode connected to the base of transistor T2 and its anode to ground. A diode D6 has its anode connected to the base of transistor T2 and its cathode connected to a capacitor C7 which has its other side grounded. A resistor R18 is in parallel with capacitor C7.

A capacitor C5 is connected to the junction point between resistors R16 and R17 and has its other side connected to a pair of diodes D4 and D5. The diode D5 has its cathode connected to ground and the diode D4 has its anode connected to a capacitor C6 and to a resistor R15 which has its other side connected to wiper contact 90 which engages a resistor R14. A suitable biasing voltage is connected to one end of the resistor R14 and the other end is connected to ground.

The emitter of transistor T3 is connected to a suitable biasing source through resistor R30 which has a capacitor C13 in parallel with it. A diode D8 has its cathode connected to ground and its anode connected to resistors R25 and R31. The other side of resistor R25 is connected to the operational amplifier 94 and a capacitor C11 which has its other side connected to ground. Resistor R31 is connected between the resistor R30 and resistor R25. A resistor R29 is connected from the base of transistor T3 to the resistor R31. A resistor R32 is connected between resistors R22 and R28. Resistor R28 has its other side connected to the collector of transistor T3. Resistor R33 is connected between the base of transistor T3 and resistor R32.

In operation this invention allows both the internal and external structure of the heart to be observed during its normal cycle at rates of 24 frames per second. The heart may be observed on a display unit 28 and a two-dimensional cross section either continuously or may be photographed by the camera 33 on a single frame-by-frame basis.

In a particular embodiment, the 5 MHz piezoelectric transducers 16a–16d were 5 mm in diameter and the catheter 13 was rotated at 360 rpm and each of the four transducers were sequentially utilized during the same 90° segment of rotation. Thus four sequential frames of information are displayed per revolution. As each of the transducers falls within the 90° segment in which their associated switches 47, 48, 49 and 51 are closed, it will be pulsed by the pulser 26 and ultrasonic energy will pass from the transducer through the coupling fluid between the transducer and the protective capsule 72 then through the fluid 74 and through the walls of the balloon 73. The energy then will pass through the esophagus to the heart tissue and will be reflected from the heart back through the esophagus, the balloon 73, the fluid 74, the capsule 72 and through the silicon oil to the transmitting transducer 16. The energy will then pass to the receiver 27 and will be displayed on the cathode ray tube 29.

The radial sweep generator 37 produces two output signals: one a 5 KHz sawtooth; and, the second a pulser sync pulse which occurs at the beginning of each sawtooth. The pulser gate is supplied to the pulser 26 to initiate its operation and the pulser transmits a pulse through the coaxial cable 24 and the mercury pool cable connector 53. From the mercury pool connector 53 the pulse passes through the coaxial cable 52 which is rotating along with the hollow sine-cosine potentiometer 22 and to the commutator 21. The commutator sends the pulse to one of the four coaxial cables of the hollow center of the catheter wall 13 to one of the appropriate transducers 16a–16d at the catheter tip 14. The echo received from the tissue interfaces then returns along the same path as that which the transmitted pulse follows to the receiver 27. The receiver is a 5 MHz high-gain amplifier and produces the signals for the Z input to the display unit 28.

So that the echoes are displayed in the proper position on the display unit 28, the rotary coupled sine-cosine potentiometer 22 transmits four signals to the sweep logics 38 and 39. It is to be realized that the sine-cosine potentiometer 22 is a standard commercial item and that it produces output proportional to sin $\theta$, sin ($\theta$ + 90°), cos $\theta$, and cos ($\theta$ + 90°). By logically gating these signals repetitive 90° segments of sine $\theta$ are transmitted to the X analog multiplier 36. Also, repetitive 90° segments of sine ($\theta$ + 90°) are transmitted to the Y analog multiplier 34. These signals modulate the sawtooth wave from the radial sweep generator 37 and the outputs of the multipliers 36 and 34 are fed directly to the X and Y inputs of the display unit 28. In the particular apparatus constructed, one radial sweep occurred each 200 microseconds which was synchronized with the position of the rotating transducer being utilized during the one-fourth revolution under study. It is to be realized, of course, that the one-fourth revolution utilized is that sector in which the heart falls from the position of the transducer tip 14. Each tissue interface appears as an intensified dot along the radial sweep of the beam of the display unit 28 and a series of approximately 200 of these radial sweep lines slightly displace from the previous one as the catheter rotates through one 90° segment produces a two-dimensional cross section of the heart. This cross section trace is illustrated by numeral 32 in FIG. 1.

During continuous operation this is repeated four times per revolution each corresponding to one of the transducers passing through that 90° segment which is being utilized and thus the real time dynamics of the heart will be displayed on the indicator 28.

The present invention differs from the prior art in that the maximum data acquisition rate is limited only be the velocity of sound. Thus, in the design example 24 frames per second which comprises the normal movie speed are obtained when the catheter is rotated at 360 rpm. If the depth penetration of the ultrasonic energy is limited to 15 cm a pulse repetition frequency of 5,000 Hz will produce 208 lines per raster or 24 frames per second. This allows the maximum data acquisition rate and the dynamics of the heart will be immediately observed on the oscilloscope as the heart changes position and size.

It is seen that this invention provides new and novel apparatus and means for observing the dynamics of the heart in real time so that the heart may be observed and treated.

The visualization parameters may be optimized for a particular diagnostic task to give the best display by controlling the independent variables of frames per second, frame sector angle and pulse repetition frequency.

Although the invention has been described by using a rotating catheter with four transducers, it is to be realized that the catheter could be oscillated about the center of a sector and this would require that only one transducer would be required in the catheter. Also the commutator and multiple leads would be eliminated with such oscillating structure.

Although minor modifications might be suggested by those versed in the art, it should be understood that we wish to embody within the scope of the patent warranted hereon all such modifications as reasonable and properly come within the scope of our contribution to the art.

What we claim is:

1. A machine for obtaining information at a high data acquisition rate comprising: a housing, a driving motor mounted on said housing, a probe cylinder rotatably driven by said motor, a plurality of ultrasonic transducers symmetrically mounted on said probe cylinder and rotating therewith, and mounted to transmit and receive energy in a plane normal to the axis of rotation of said probe cylinder, a plurality of electrical leads respectively connected to said ultrasonic transducers, a first disc mounted on said probe cylinder, a plurality of reed switches symmetrically mounted on said first disc and each switch having first sides connected to one of said plurality of electrical leads, a second magnetic disc mounted on said probe cylinder adjacent said first disc, magnetic shielding means mounted on said housing between said first and second discs for sequentially closing said reed switches as said probe cylinder rotates, a common lead connecting the second sides of said switches connected together, an input-output lead electrically connected to said common lead, a pulser connected to said input-output lead, a receiver connected to said input-output lead, a presentation means connected to said receiver, a radial sweep timing generator connected to said pulser and said presentation means for displaying a visualization taken in said plane normal to the axis of rotation of said probe cylinder and means responsive to probe rotation for modifying the output of said timing generator to provide X and Y information in said visualization.

2. A machine according to claim 1 wherein there are four equally spaced ultrasonic transducers, four electrical leads, and four reed switches.

* * * * *